(12) United States Patent
Geiger et al.

(10) Patent No.: US 8,223,657 B2
(45) Date of Patent: Jul. 17, 2012

(54) MODIFYING SYSTEM CLOCKS BASED ON PARTICULAR WLAN CHANNEL THAT IS SELECTED TO IMPROVE RF SENSITIVITY OF A RADIO MODULE

(75) Inventors: Ed Geiger, San Martin, CA (US); Vinh Le, Fremont, CA (US); Nhan Nguyen, San Jose, CA (US); Julie Phan, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 519 days.

(21) Appl. No.: 12/549,043

(22) Filed: Aug. 27, 2009

(65) Prior Publication Data

US 2011/0051700 A1    Mar. 3, 2011

(51) Int. Cl.
*H04W 24/02* (2009.01)
(52) U.S. Cl. ........................................ 370/241; 370/252
(58) Field of Classification Search ................. 370/241, 370/252
See application file for complete search history.

(56) References Cited

U.S. PATENT DOCUMENTS

| | | | |
|---|---|---|---|
| 2007/0153010 A1* | 7/2007 | Uhlik | 345/501 |
| 2008/0081586 A1* | 4/2008 | Sreerama et al. | 455/255 |
| 2009/0138745 A1* | 5/2009 | Dorsey et al. | 713/501 |
| 2010/0137025 A1* | 6/2010 | Tal et al. | 455/553.1 |

* cited by examiner

*Primary Examiner* — Melvin Marcelo (57) ABSTRACT

Techniques are provided for selecting one of a plurality of clock signals used to drive a bus of a WLAN-enabled device having a WLAN radio module coupled to the bus and designed to operate over a plurality of WLAN channels. A network infrastructure device, such as an access point or port, is provided that comprises a WLAN radio module, a PCI bus coupled to the WLAN radio module, a look up table (LUT) and a processor. The WLAN radio module designed to operate over a plurality of WLAN channels in a first frequency band. The LUT comprises a plurality of entries. Each entry comprises: a particular one of the WLAN channels and a corresponding one of a first clock signal having a first clock frequency and a second clock signal having a second clock frequency that is to be selected. The first clock signal causes interference at the WLAN radio module when operating over a first subset of the WLAN channels, and the second clock signal causes interference at the WLAN radio module when operating over a second subset of the WLAN channels. The processor selects, from the LUT based on the one of the WLAN channels that has been selected for the WLAN radio module to communicate over, either the first clock signal or the second clock signal that is to be used to drive the bus.

16 Claims, 6 Drawing Sheets

| CHANNEL NUMBER | OPERATING FREQUENCY WITHIN THE 2.4 GHz FREQUENCY BAND IN MHz | CLOCK SOURCE FREQUENCY IN MHz |
|---|---|---|
| 1 | 2412 | 66.667 |
| 2 | 2417 | 66.667 |
| 3 | 2422 | 66.667 |
| 4 | 2427 | 66.667 |
| 5 | 2432 | 66.667 |
| 6 | 2437 | 66.667 |
| 7 | 2442 | 66.667 |
| 8 | 2447 | 66.667 |
| 9 | 2452 | 64.000 |
| 10 | 2457 | 64.000 |
| 11 | 2462 | 64.000 |
| 12 | 2467 | 64.000 |
| 13 | 2472 | 64.000 |
| 14 | 2484 | 64.000 |

| CHANNEL NUMBER PAIRS | OPERATING FREQUENCY WITHIN THE 2.4 GHz FREQUENCY BAND IN MHz | CLOCK SOURCE FREQUENCY IN MHz |
|---|---|---|
| 1 + 5 | 2422 | 66.667 |
| 2 + 6 | 2427 | 66.667 |
| 3 + 7 | 2432 | 66.667 |
| 4 + 8 | 2437 | 66.667 |
| 5 + 9 | 2442 | 66.667 |
| 6 + 10 | 2447 | 66.667 |
| 7 + 11 | 2452 | 64.000 |

*FIG. 6*

MODIFYING SYSTEM CLOCKS BASED ON PARTICULAR WLAN CHANNEL THAT IS SELECTED TO IMPROVE RF SENSITIVITY OF A RADIO MODULE

FIELD OF THE INVENTION

The present invention generally relates to wireless communication devices, and more particularly relates to techniques for reducing noise and interference at a Wireless Local Area Network (WLAN) radio module.

BACKGROUND OF THE INVENTION

Many wireless computer networks have been defined in which a wireless computing device communicates with a network via an access point (AP). One common example is described in the IEEE 802.11 standard. As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein are incorporated by reference in their entirety and may be obtained at http://standards-.ieee.org/getieee802/index.html or by contacting the IEEE at IEEE, 445 Hoes Lane, PO Box 1331, Piscataway, N.J. 08855-1331, USA. The IEEE 802.11 standards are incorporated by reference herein in their entirety.

An access point or access port (AP) device used in a WLAN typically includes many different modules within an enclosure or housing. Some of the modules within the enclosure include a WLAN radio module, a clock source and a PCI bus that couples the clock source to the WLAN radio module. The clock source generates a clock signal that it provides over the PCI bus to the WLAN radio module. A WLAN radio module can operate over one of a number WLAN channels. For example, an IEEE compliant WLAN radio module can operate over any one of fourteen different WLAN channels at any particular time.

Because the clock source and the PCI bus are coupled to the WLAN radio module, and within close proximity of the WLAN radio module, the clock signal generated by the clock source can also be inadvertently picked up or received by the WLAN radio module. When the WLAN radio module operates over particular ones of the WLAN channels, the clock signal that is used to drive the PCI bus generates harmonics of its fundamental clock frequency, and some of these harmonics can act as noise at the WLAN radio module. When operating over certain WLAN channels, this noise can cause interference with respect to incoming radio frequency (RF) signals that the WLAN radio module is receiving and processing. As such, one drawback with such AP architectures is that when the WLAN radio operates over particular WLAN channels, the clock signal can cause noise and interference at the WLAN radio module. Among other things, this interference can reduce receive sensitivity (RS) at the WLAN radio module.

Accordingly, it is desirable to provide techniques for reducing noise and interference caused by a clock signal generated by a clock source and/or carried on a PCI bus that is close proximity to a WLAN radio module. Furthermore, other desirable features and characteristics of the present invention will become apparent from the subsequent detailed description of the invention and the appended claims, taken in conjunction with the accompanying drawings and this background of the invention.

BRIEF SUMMARY

Techniques are provided for selecting one of a plurality of clock signals used to drive a bus of a device having a radio module coupled to the bus and designed to operate over a plurality of radio channels.

In one embodiment, a radio frequency (RF) device is provided that comprises a radio module, a bus coupled to the radio module, a look up table (LUT) and a processor. The radio module designed to operate over a plurality of channels in a first frequency band. The look up table (LUT) comprises a plurality of entries. Each entry comprises: a particular one of the channels and a corresponding one of a first clock signal having a first clock frequency and a second clock signal having a second clock frequency that is to be selected. The first clock signal causes interference at the radio module when operating over a first subset of the channels, and the second clock signal causes interference at the radio module when operating over a second subset of the channels. The processor selects, from the LUT based on the one of the channels that has been selected for the radio module to communicate over, either the first clock signal or the second clock signal that is to be used to drive the bus. A logic device that receives the first clock signal and the second clock signal, can then receive a command from the processor, and, in response to the command, drive the bus, with either the first clock signal or the second clock signal that is selected by the processor. In one embodiment, the RF device can be, for example, a network infrastructure device, such as an access point or port.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention. The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Before describing in detail embodiments that are in accordance with the present invention, it should be observed that the embodiments reside primarily in combinations of method steps and apparatus components related to reducing noise and interference at a Wireless Local Area Network (WLAN) radio module. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions for reducing noise and interference at a WLAN radio module described herein. The non-processor circuits may include, but are not limited to, a radio receiver, a radio transmitter, signal drivers, clock circuits, power source circuits, and user input devices. As such, these functions may be interpreted as steps of a method for reducing noise and interference at a WLAN radio module. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview of the Disclosed Embodiments

In accordance with some of the disclosed embodiments, a radio frequency (RF) device is provided that comprises a bus, a first clock source that generates a first clock signal having a first clock frequency, a second clock source that generates a second clock signal having a second clock frequency, a WLAN radio module coupled to the bus, a look up table (LUT), and a processor coupled to the bus and the WLAN radio module.

The WLAN radio module is designed to communicate over a plurality of WLAN channels in a first frequency band, and at any particular time can be configured to operate over one of the WLAN channels. For instance, in one implementation, when the first frequency band is the 2.4 GHz frequency band, the first clock frequency is approximately 64.000 MHz, and the second clock frequency is approximately 66.667 MHz.

The clock signals are used to drive the bus, which in one implementation can be a Peripheral Component Interconnect (PCI) bus. Harmonics of the first clock signal can causes interference at the WLAN radio module when the WLAN radio module is operating over a first subset of the WLAN channels, and harmonics of the second clock signal can cause interference at the WLAN radio module when the WLAN radio module is operating over a second subset of the WLAN channels. The LUT comprises a plurality of entries. Each entry comprises a particular one of the WLAN channels and a corresponding one of the first clock signal or the second clock signal that is to be used to drive the bus when the WLAN radio module is operating over that particular WLAN channel.

Based on the WLAN channel that has been selected (for the WLAN radio module to communicate over), the processor can determine from the LUT that either the first clock signal or the second clock signal is to be used to drive the bus. In one implementation, the processor can generate a command to select either the first clock signal or the second clock signal as the particular clock signal that is to be used to drive the bus. Upon receiving the command, a logic device can drive the bus with either the first clock signal or the second clock signal specified by the command. By selecting the appropriate clock signal to drive the PCI bus, noise and interference at the WLAN radio module that is caused by the clock signal can be reduced and/or eliminated.

Prior to discussing example embodiments in accordance with the present invention, an exemplary network and wireless communication device will be described with reference to FIGS. 1 and 2.

Exemplary Network

Figure 1:
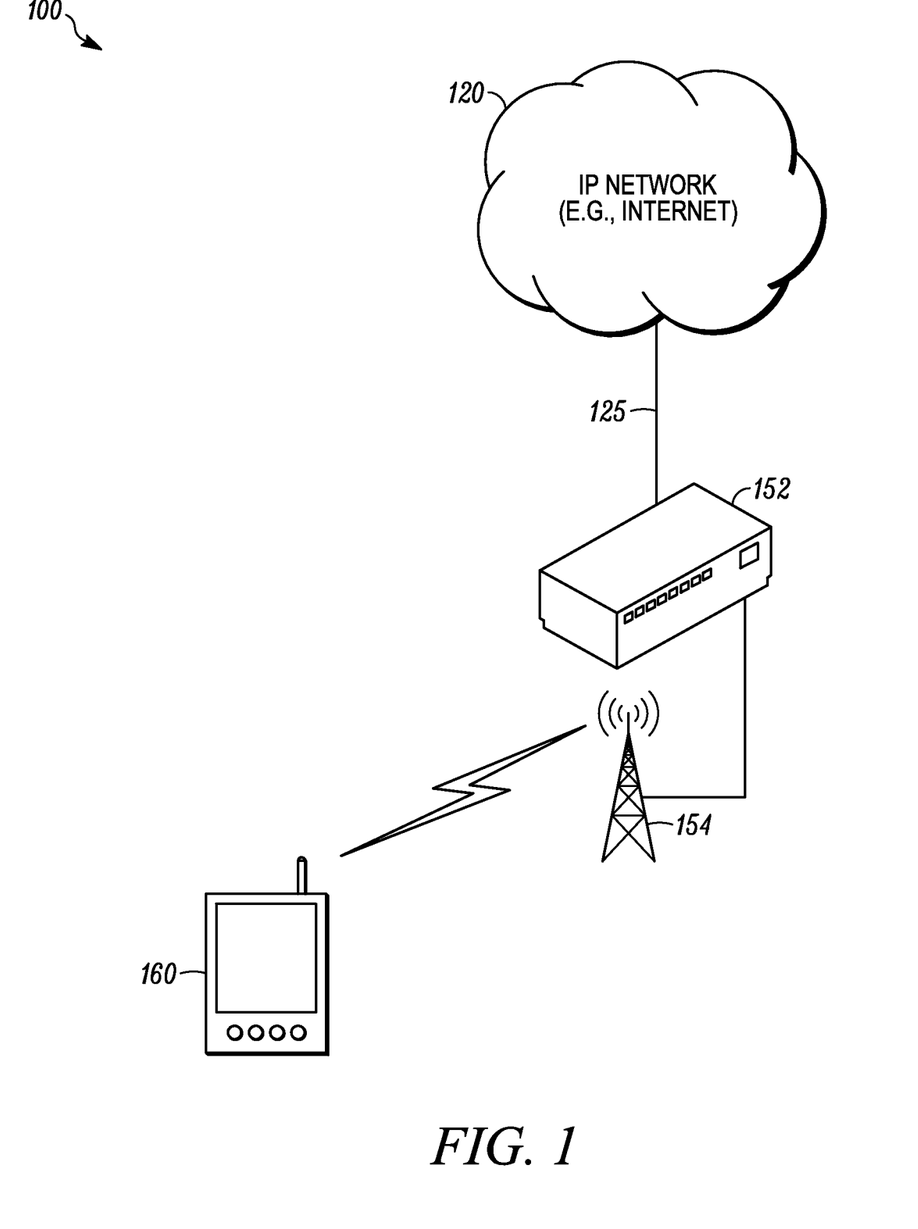
FIG. 1 illustrates an exemplary network.

FIG. 1 illustrates an exemplary network 100 which includes an IP network 120, an optional wireless switch 152, an access point 154, and a wireless communication device 160. A link 125 couples to the wireless switch 152 to an IP-based network 120 which may comprise, for example, the Internet or an intranet. Although FIG. 1 illustrates a single link 125, in other practical implementations, there may be multiple logical links and intermediate devices such as routers which couple the wireless switch 152 to the IP-based network 120. Although not illustrated, the AP 154 can simultaneously serve multiple wireless client devices within a defined network area. It will be appreciated by those skilled in the art that although FIG. 1 shows an exemplary network configuration in which one wireless communication device 160 is present, in many cases many wireless communication devices can be configured as part of the network 100 at any given time.

As used herein, the term "wireless communication device" refers to any portable computer or other hardware designed to communicate with an infrastructure device of an access network over an air interface through a wireless channel. Wireless communication devices can be "handheld," and potentially mobile or "nomadic" meaning that the wireless communication device 160 can physically move around the WLAN, but at any given time may be mobile or stationary. The wireless communication device 160 can be one of any of a number of different types of mobile communication devices, which include without limitation, mobile stations (e.g. mobile telephone handsets, mobile radios, mobile computers, hand-held or laptop devices and personal computers, a PC card, personal digital assistants (PDAs), or the like), access terminals, subscriber stations, user equipment, compact flash, external or internal modem, or any other devices configured to communicate via wireless communications. The wireless communication device 160 can communicate with the AP 154 in accordance with any known communication standards such as those based on IEEE 802.11 (e.g., 802.11a, 802.11b, 802.11g, 802.11n, etc.).

The AP 154 allows the wireless communication device 160 to connect to and communicate with the wireless local area network (LAN) 100. The access point 154 can relay data between the wireless communication devices and wired computing devices on the WLAN. The AP 154 directly serves as a point of interconnection between the WLAN and the fixed wired network and allows wireless communication devices to be quickly and easily connected to a wired LAN. In general, an access point is a network-capable device containing a transceiver and antenna for transmitting signals to and receiving signals from the remote client devices or stations. Each access point has full MAC functionality and sufficient program logic and processing power to allow it to enforce policies relating to access and usage. Although only one AP 154 is illustrated in FIG. 1, a conventional WLAN can include any number of such access points.

In the embodiment illustrated in FIG. 1, the access point 154 is illustrated as being coupled to a wireless switch 152; the wireless switch 152 is optional and can be implemented in some, but not all, network architectures. When a wireless switch device 152 is implemented, instead of access points, simplified access ports can be used in conjunction with a wireless switch device 152. These access ports, sometimes referred to as thin access points, have reduced MAC functionality in comparison to regular or "fat" access points that have full MAC functionality, and many of the higher level MAC functions that would be implemented in a conventional access point are implemented at the wireless switch device instead. The wireless communication device 160 communicates with an AP 154 over the air via wireless packets (e.g., IEEE 802.11 data packets), and the AP 154 passes the wireless packets to the wireless switch over a wire that connects the wireless switch 152 and the AP 154. In other words, the wireless switch 152 communicates wireless packets encapsulated in wired packets (e.g., IEEE 802.11 packets encapsulated in IEEE 802.3 packets) with the AP 154. The wireless switch 152 receives data packets, going to or received from one of its connected access ports 154, and processes those data packets, which would have traditionally been processed by a "thick" access point.

Figure 2:
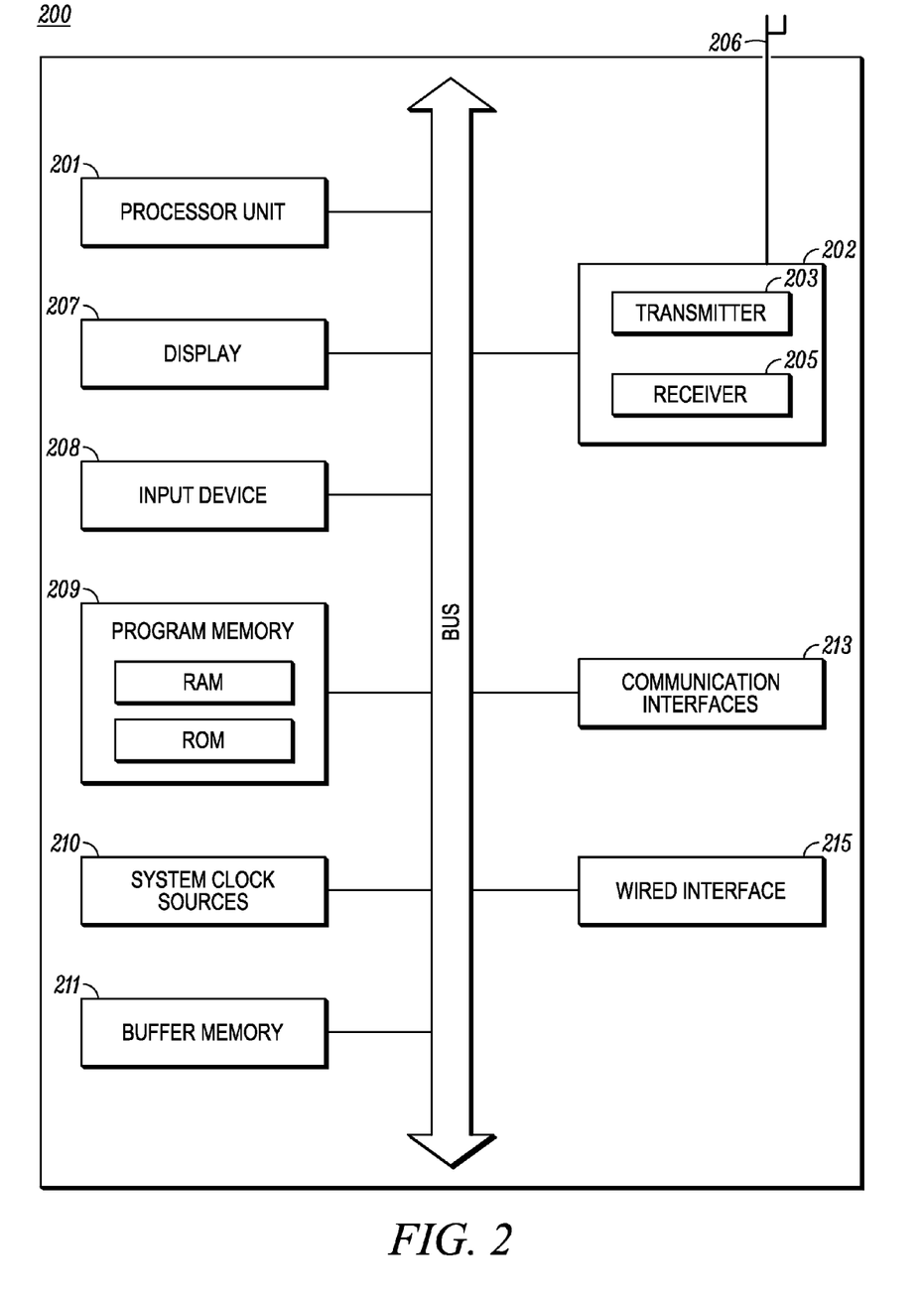
FIG. 2 is a simplified block diagram which illustrates an exemplary wireless communication device according to one exemplary implementation.

FIG. 2 is a simplified block diagram which illustrates an exemplary wireless communication device 200 according to one exemplary implementation. In the description that follows, the wireless communication device 200 will be referred to as an AP 200; however, it will be appreciated that the wireless communication device 200 can also be other types of devices including network access devices.

The AP 200 comprises a processor 201, a transceiver 202 including a transmitter circuitry 203 and a receiver circuitry 205, at least one bus 204, an antenna 206, a program memory 209 for storing operating instructions that are executed by the processor 201, system clock sources 210, a buffer memory 211, and one or more communication interfaces including at least one wireless local area network (WLAN) interface 213 (e.g., an IEEE 802.11 compliant interface such as an IEEE 802.11n interface), and at least one wired network interface 215 (e.g., an IEEE 802.3 interface). Although not shown, the AP 200 also can include an antenna switch, duplexer, circulator, or other highly isolative means (not shown) for intermittently providing information packets from the transmitter circuitry 203 to the antenna 206 and from the antenna 206 to the receiver circuitry 205. The AP 200 is an integrated unit within one enclosure or housing that contains at least all the elements depicted in FIG. 2, as well as any other known elements or modules necessary for the AP 200 to operate including microprocessors, digital signal processors, customized processors, storage devices, look up tables, field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented in one or more application specific integrated circuits (ASICs), in which each function or some combinations of certain of the functions are implemented as custom logic.

The processor 201 includes one or more microprocessors, microcontrollers, DSPs (digital signal processors), state machines, logic circuitry, lookup tables or any other device or devices that process information based on operational or programming instructions. Such operational or programming instructions are stored in the program memory 209. The program memory 209 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 201 has one or more of its functions performed by a state machine or logic circuitry, the memory 209 containing the corresponding operational instructions can be embedded within the state machine or logic circuitry. The operations performed by the processor 201 and the other elements of the AP 200 are described in detail below.

The transmitter circuitry 203 and the receiver circuitry 205 enable the AP 200 to communicate information packets to and acquire information packets from the other nodes. In this regard, the transmitter circuitry 203 and the receiver circuitry 205 include appropriate, conventional circuitry to enable digital or analog transmissions over a wireless communication channel. The transmitter circuitry 203 and the receiver circuitry 205 are designed to operate over an ad hoc networking air interface (e.g., IEEE 802.11 based, IEEE 802.15 based, and the like).

The implementations of the transmitter circuitry 203 and the receiver circuitry 205 depend on the implementation of the AP 200. For example, the transmitter circuitry 203 and the receiver circuitry 205 can be implemented as an appropriate wireless modem, or as conventional transmitting and receiving components of two-way wireless communication devices. The transmitter circuitry 203 and the receiver circuitry 205 are preferably implemented as part of the wireless device hardware and software architecture in accordance with known techniques. One of ordinary skill in the art will recognize that most, if not all, of the functions of the transmitter circuitry 203 and/or the receiver circuitry 205 can be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving radio frequency (RF) signals over multiple frequency bands. The receiver circuitry 205 can optionally comprise a first receiver and a second receiver, or one receiver capable of receiving in two or more frequency bands. The receiver 205, depending on the mode of operation, can be tuned to receive, for example, wireless local area network (WLAN) communication signals such as those complying with one or more of the IEEE 802.11 standards. The transceiver 202 includes at least one set of transmitter circuitry 203. The at least one transmitter 203 can be capable of transmitting to multiple devices potentially in multiple frequency bands.

The antenna 206 comprises any known or developed structure for radiating and receiving electromagnetic energy in the frequency range containing the wireless carrier frequencies.

The buffer memory 211 can be any form of volatile memory, such as random access memory (RAM), and is used for temporarily storing received information packets in accordance with the present invention.

Figure 3:
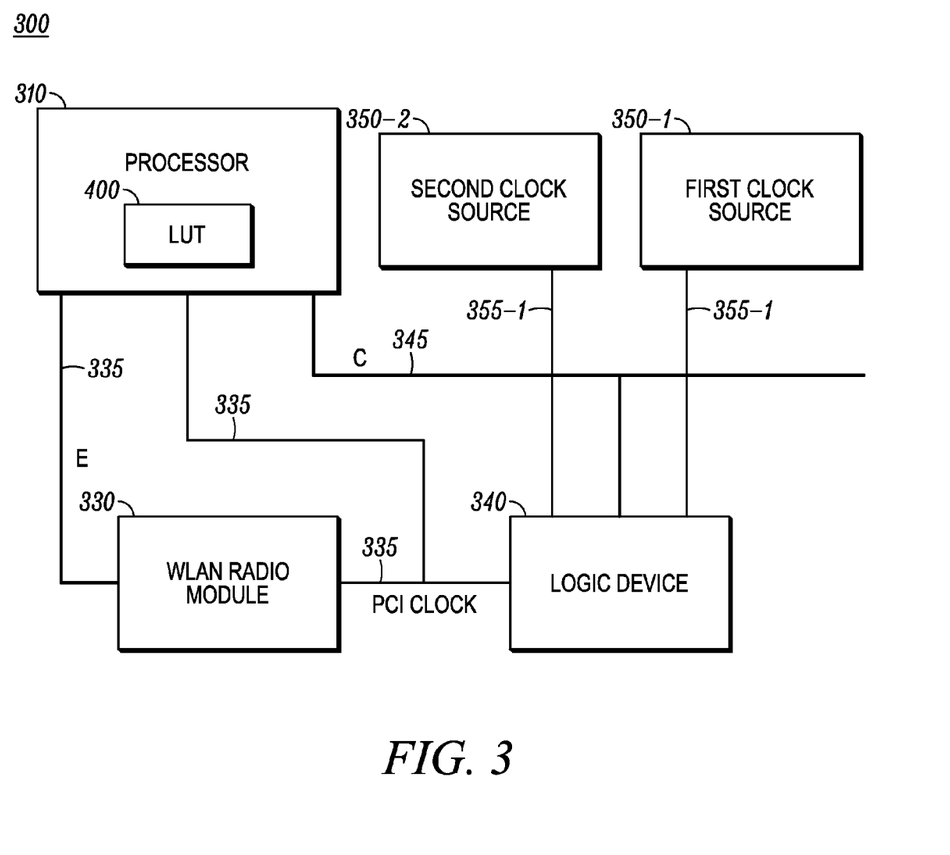
FIG. 3 is a block diagram of a wireless communication device in accordance with some of the disclosed embodiments.

FIG. 3 is a block diagram of a wireless communication device 300 in accordance with some of the disclosed embodiments. The device 300 includes a processor 310 including a look up table (LUT) 400, a WLAN radio module 330, a Peripheral Component Interconnect (PCI) bus 335, a logic device 340, a first clock source 350-1, and a second clock source 350-2. The wireless communication device 300 can include some or all of the modules illustrated in FIG. 2 and in one non-limiting embodiment the device 300 can be implemented as an access point or access port that includes a WLAN radio module. Although the implementation describe below is described with respect to an access point/port that includes a WLAN radio module, it is to be appreciated that the disclosed embodiments can be applied to other type of wireless communication devices that communicate via radio frequencies and that use other types of non-WLAN radio modules.

The processor 310 can be any processor described above in conjunction with FIG. 2. In one implementation, the processor can include (in addition to other processors) an embedded network processor. One non-limiting example of an embedded network processor is the Cavium CN5010 that is produced by Cavium Networks of Mountainview, Calif., 94043.

The WLAN radio module 330 is communicatively coupled to the processor 310 via the PCI bus 335, and is also coupled to the PCI bus 335. The WLAN radio module 330 communicates with the processor 310 over the bus 335. In one implementation, the WLAN radio module 330 includes a wireless network processor unit, full Ethernet MAC functionality, full IEEE 802.11 MAC functionality, baseband processing functionality, and radio front end functionality including a high output power radio. As will be described below, the WLAN radio module 330 is designed to operate over particular WLAN channels, such as IEEE 802.11 channels, and in one implementation, the WLAN radio module 330 complies with the IEEE 802.11n standard. The WLAN radio module 330 can operate in at least two frequency bands (i.e., the 2.4 GHz ISM band, and 5.2 to 5.8 GHz ISM bands), where each frequency band includes a number of frequency sub-bands, and where each sub-band corresponds to a WLAN channel having a particular center frequency. At any given time, the WLAN radio module 330 is configured to communicate over one of a plurality of WLAN channels within each frequency band. Each WLAN channel has a particular center frequency and covers a particular frequency sub-band of the overall frequency band. The WLAN radio module 330 can be assigned to operate on one of these WLAN channels either manually by user input or by software running in the WLAN radio module 330 or processor 310.

The PCI bus 335 is coupled to the processor 310 and the WLAN radio module 330 and provides a particular clock signal used to drive the processor 310 and the WLAN radio module 330. As understood by those skilled in the art, PCI is a computer bus standard used for attaching hardware devices. The PCI specification covers the physical size of the bus (including wire spacing), electrical characteristics, bus timing, and protocols. The PCI specification can be obtained from the PCI Special Interest Group (PCI-SIG) at 3855 SW 153rd Drive, Beaverton, Oreg. 97006, and is incorporated by reference herein in its entirety. Although the bus 335 is described as being a PCI bus, the disclosed embodiments are not necessarily limited to using any particular bus standard. The bus 335 can be implemented using other known bus types that comply with other bus standards such as Personal Computer Memory Card International Association (PCMCIA) standards.

A conventional PCI bus is thirty-two (32) bits wide, includes thirty-two (32) data lines and another twelve (12) controls lines. As such, there are potentially forty-four lines changing state with each rising edge of a clock signal. The bus frequency is one-half of the fundamental clock frequency of the clock source. In other words, even though data is clocked across the PCI bus 335 at a particular clock frequency, the thirty-two (32) data lines of the PCI bus 335 can only change on each edge of the clock, and because the rising edge is used change a data line from 1 to 0 and then 0 to 1 on each clock edge, the effective bus frequency is one-half the clock frequency of the clock source.

The logic device 340 is coupled to the WLAN radio module 330 via line 335 (i.e., PCI bus), and to a PCI interface of the processor 310 via line 345 (in one implementation line 345 can be a peripheral or "boot" bus (e.g., serial EEPROM) commonly used in embedded network processors). The logic device 340 can also provide a clock signal to the processor 310 and the WLAN radio module 330 via the PCI bus 335. The logic device 340 can be any one of a number of complex programmable logic devices (CPLDs) that is known in the art.

A clock signal 355 is used to drive a PCI bus 335. The clock source 350 that generates the clock signal 355, and/or the bus 335 that carries the clock signal 355, can be placed in close proximity to the WLAN radio module 330. When the WLAN radio module 330 operates over particular ones of the WLAN channels, the clock signal 355 that is used to drive the PCI bus 335 can generate harmonics which can act as noise at the WLAN radio module 330. Clock and/or PCI bus emissions at certain harmonics can couple to the WLAN radio module 330 and cause interference with a signal received by the WLAN radio module 330. In other words, inside the enclosure that houses the components/modules of the AP 300, emissions from the clock source and/or PCI bus 335 at harmonic frequencies can radiate into the receiver of the WLAN radio module 330 to raise the noise floor and act as noise that is added to the incoming WLAN signal picked up by the receiver of the WLAN radio module 330. Thus, the clock source and/or clock signal transitions on the PCI bus 335 can contribute to radio system noise, thereby reducing the RS. This can cause interference with respect to incoming radio frequency (RF) signals that the WLAN radio module 330 is receiving and processing. Among other things, this interference can reduce receive sensitivity (RS) at the WLAN radio module 330. Receive sensitivity (RS) can be defined as the minimum magnitude of input signal required to produce a specified output signal having a specified signal-to-noise ratio, or other specified criteria. RS can be defined by how well the radio can receive packets at a given signal strength. For example, if 1000 packets (at fixed signal strength) are received at a receiver, the RS can be measured by recording how many of the 1000 packets were successfully received.

The inventors observed that RS across all WLAN channels (within the 2.4 GHz band) did not have similar radio sensitivities, and further that there is a relationship between RS and how close the WLAN channel was to a harmonic of the clock source and its signal that are driving the PCI bus 335. As clock harmonics approach a center frequency of the WLAN channel, the harmonics can significantly change the radio sensitivity. The inventors attempted to identify that clock frequency that could be used on all channels in the 2.4 GHz band, but could not identify one particular clock frequency that works with all WLAN channels.

In accordance with the disclosed embodiments, two clock sources 350-1, 350-2 are provided to the logic device 340, and the clock signal that is used to drive the PCI bus 335 can be from either the first clock signal 355-1 or the second clock signal 355-2. In particular, based on the WLAN channel selected to be used by the WLAN radio module 330, the processor 310 can dynamically select which one of the clock signals 355-1, 355-2 will be provided from the logic device 340 and used to drive the PCI bus 335. Stated differently, at any particular time, depending on the WLAN channel that the WLAN radio module 330 is using for communication, either one of these clock sources 350 can be selected by the processor 310. Processor 310 can then command the logic device 340 to use the selected one of the clock signals 355-1, 355-2 to drive the PCI bus 335. Based on a command received from the processor 310, the logic device 340 generates an appropriate one of the clock signals 355-1, 355-2 on PCI bus 335. As the WLAN channel assigned to the WLAN radio module 330 changes, the logic device 340 includes logic that transparently switches between one clock signal and the other. In accordance with the disclosed embodiments, the frequency of the clock source 350 used to drive the PCI bus 335 can be changed for WLAN channels which exhibit poor RS to improve their RS. Although the particular implementation described here is described with respect to two clock sources, it is to be appreciated that the disclosed embodiments can be applied to work with more than two clock sources.

Non-limiting examples of these techniques will now be described below with reference to FIGS. 4 and 5.

Exemplary Implementation of the LUT

One non-limiting example of the LUT 400 will now be described with reference to FIG. 4. FIG. 4 is a lookup table 400 in accordance with one exemplary implementation of the disclosed embodiments. The LUT 400 in FIG. 4 can be used when the WLAN radio module 330 operates in the 2.4 GHz band and communicates via a single WLAN channel at any particular time. In this non-limiting example, it is assumed that the WLAN radio module is operating in a 20 MHz high throughput (HT20) mode in which the WLAN radio module 330 can operate over any one of the 14 WLAN channels at any particular time. Column 1 of the LUT 400 lists channel numbers in the 2.4 GHz frequency band, column 2 of the LUT 400 lists center frequencies corresponding to each of the channel numbers in column 1, and column 3 lists a clock frequency that should be selected when the WLAN radio module 330 operates over a corresponding WLAN channel defined in columns 1 and 2. As such, the LUT 400 comprises a plurality of entries, where each entry is specified in a row of the table. Each entry includes (1) a particular WLAN channel number, (2) a corresponding center frequency of that WLAN channel, and (3) a corresponding one of the first clock signal 355-1 or the second clock signal 355-2 that should be selected to drive the PCI bus 335 for that WLAN channel.

The first clock source 350-1 generates a first clock signal 351-1 having a first clock frequency. Likewise, the second clock source 350-2 generates a second clock signal 351-2 having a second clock frequency different than the first clock signal. In one embodiment, the clock sources can be implemented using crystal oscillators. In the exemplary implementation described with reference to FIG. 4, the clock sources 350-1, 350-2 have fundamental frequencies of 64.000 MHz and 66.667 MHz, respectively. In particular, the first clock source 350-1 generates a first clock signal 351-1 having a first clock frequency of 64.000 MHz, and the second clock source 350-2 generates a second clock signal 351-2 having a second clock frequency of 66.667 MHz. Each clock source radiates at the frequency it is designed to produce. For example, a clock source that is designed to oscillate at 64.000 MHz will radiate emissions at its fundamental frequency of 64 MHz, and will also have a detectable emission at each harmonic frequency as well (e.g., will radiate harmonic emissions at 128 Mhz, 192 Mhz, 256 MHz, 320 MHz . . . 2432 MHz, 2496 Mhz, . . . ) Likewise, a clock source that is designed to oscillate at 66.667 MHz will radiate emissions at its fundamental frequency of 66.667 MHz, and will also have a detectable emission at each harmonic frequency as well (e.g., will radiate harmonic emissions at 133.333 MHz, 200 MHz, 266.7 Mhz, 333.333 MHz, 400 MHz, . . . 2400 GHz, 2466.667 MHz, 2533.333 MHz . . . )

In either case, the clock signal carried on the PCI bus 335 can generate harmonics in the 2.4 GHz range that, depending on the WLAN channel the WLAN radio module 330 is operating on, can inject noise into an RF signal received by the WLAN radio module 330. For example, when WLAN radio module 330 operates on one of the WLAN channels in the 2.4 GHz frequency band and a 64.000 GHz clock source 350-1 is used, clock emissions at the $37^{th}$ harmonic (or 2.467 MHz), will be close to some of the 2.4 GHz radio channels and can impact RS at the WLAN radio module 330. Likewise, when a 66.667 MHz clock source 350-2 is used, clock emissions at the $38^{th}$ harmonic or 2.432 GHz, will be close to some of the 2.4 GHz radio channels and can impact RS at the WLAN radio module 330. In addition, harmonics of the clock signal carried on the PCI bus 335 can also impact RS at the WLAN radio module 330 since those harmonics will also be close to some of the 2.4 GHz radio channels and can potentially interfere certain WLAN channels.

Figure 4:
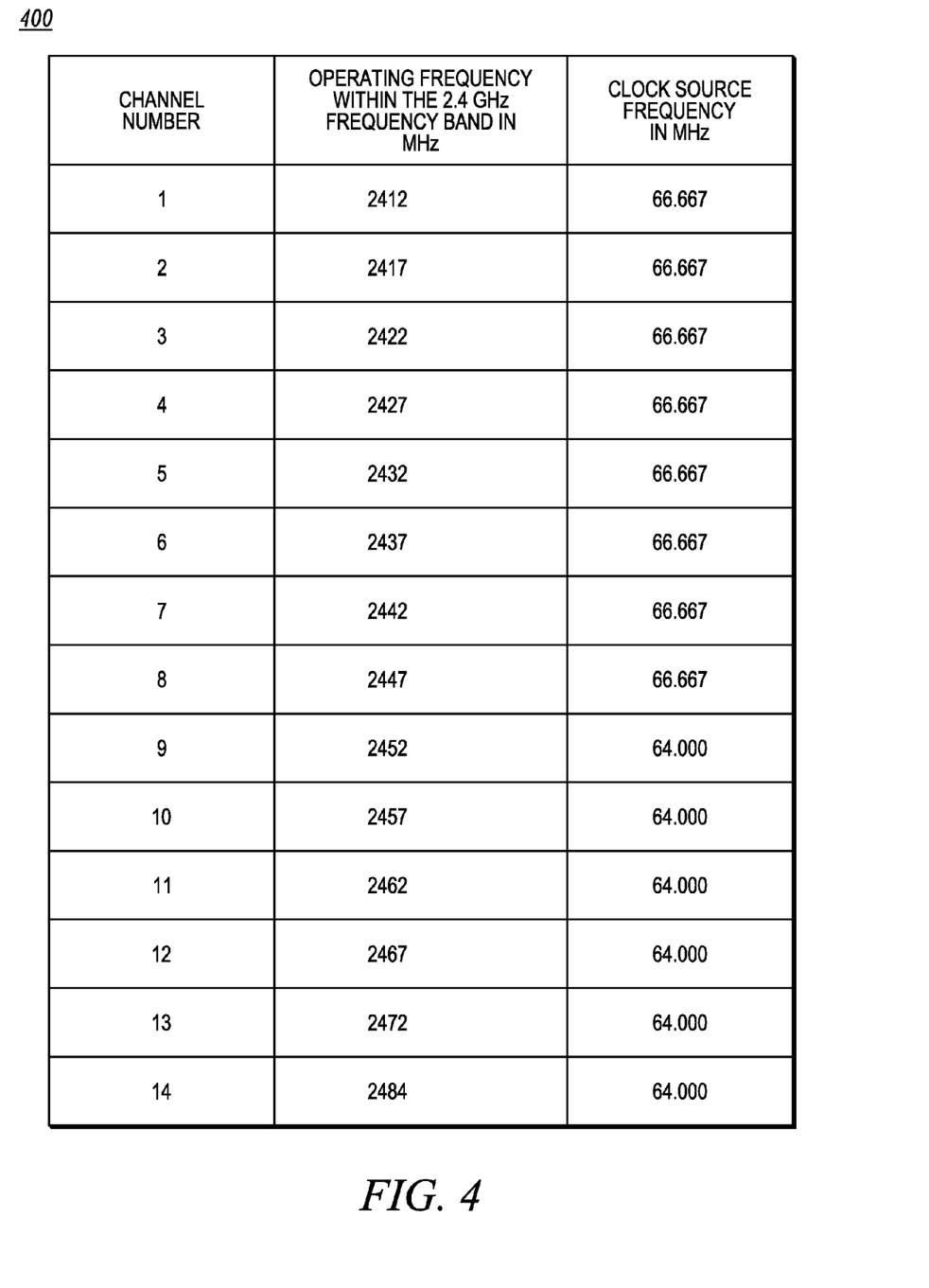
FIG. 4 is one non-limiting example of a lookup table (LUT) that can be used in accordance with some of the disclosed embodiments when a WLAN radio module operates in a 2.4 GHz Industrial Scientific and Medical (ISM) band.

FIG. 4 is one non-limiting example of a lookup table (LUT) that can be used in accordance with some of the disclosed embodiments when a WLAN radio module operates in a 2.4 GHz ISM band. The exemplary implementation of the LUT 400 illustrated in FIG. 4 identifies an appropriate PCI clock frequency that can be used for each of the 14 channels in the 2.4 GHz band without causing interference with respect to WLAN signals at the WLAN radio module 330. As shown in the LUT 400, when the WLAN radio module 330 operates on channels 1-8, the second clock source 350-2 having a fundamental clock frequency of 66.667 MHz is selected to drive the PCI bus 335. By contrast, when the WLAN radio module 330 operates on channels 9-14, the first clock source 350-1 having a fundamental clock frequency of 64.000 MHz is selected to drive the PCI bus 335.

When the WLAN radio module 330 is operating over one of a first subset of the WLAN channels (channels 9-14 in this example), the matching between the channel number in column 1 having a desired center frequency in column 2 and corresponding clock signal frequency in column 3 is designed so that when the first clock signal 355-1 is selected as the particular clock signal that is drives the PCI bus 335, the first clock signal does not cause interference at the WLAN radio module 330. Emissions of the PCI bus 335 and/or the clock source 350-1 will not interfere with the RF signal that is being received by the WLAN radio module 330. Similarly, when the WLAN radio module 330 is operating over one of a second subset of the WLAN channels (channels 1-8 in this example), the matching between the channel number in column 1 having a desired center frequency in column 2 and corresponding clock signal frequency in column 3 is designed so that when the second clock signal 355-2 is selected as the particular clock signal that drives the PCI bus 335, the second clock signal does not cause interference at the WLAN radio module 330. Emissions of the PCI bus 335 and/or the clock source 350-2 will not interfere with the RF signal that is being received by the WLAN radio module 330. As such, one of the two clock frequencies will work with any of the fourteen (14) WLAN channels in the 2.4 GHz frequency band without causing interference at the WLAN radio module 330 and degrading RS.

Operation of the WLAN radio module 330, processor 310, logic device 340, clock sources 350 and PCI bus 335 will now be described in more detail with reference to FIG. 5.

Figure 5:
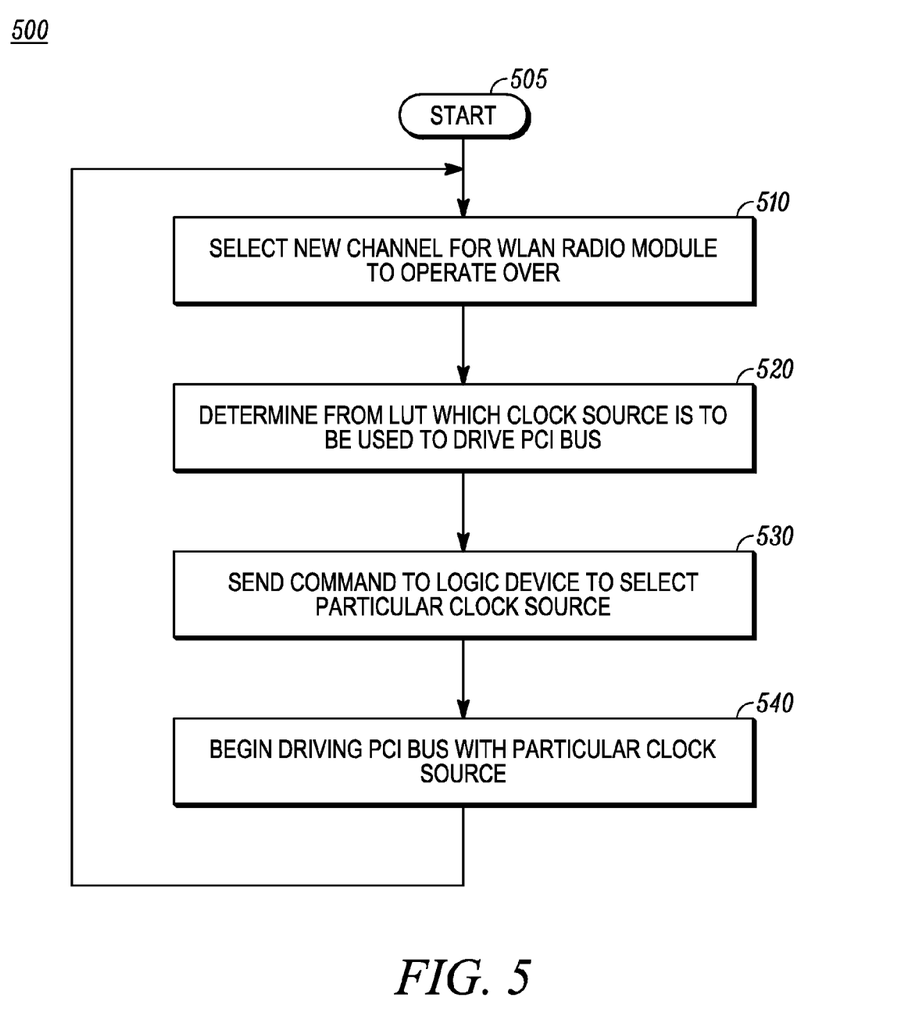
FIG. 5 is a flowchart illustrating a method for selecting an appropriate clock source based on a WLAN channel that a wireless computing device is operating on in accordance with some of the disclosed embodiments.

FIG. 5 is a flowchart illustrating a method 500 for selecting an appropriate clock source based on a WLAN channel that a wireless computing device is operating on and switching to that clock source in accordance with some of the disclosed embodiments.

The method 500 starts at step 505, and at step 510 a new channel option (i.e., a particular one of the WLAN channels) for the WLAN radio module 330 to operate over is selected. The method 500 then proceeds to step 520, where the processor 310 uses the WLAN channel selected at step 520 to lookup a corresponding entry from column 3 of the LUT 400, and determine which one of the first clock signal 355-1 or the second clock signal 355-2 is to be used to drive the PCI bus 335. As described above, each entry in column 3 of the LUT 400 specifies one of the clock sources and its corresponding fundamental clock frequency. For instance, when the WLAN radio module 330 has been assigned to operate on channel 1, the second clock source 350-2, which has a fundamental frequency of 66.667 MHz, will be selected as the clock source used to drive the PCI bus 335. Alternatively, in another implementation, at step 520, the processor 310 can use the desired center frequency of the selected WLAN channel that the WLAN radio module 330 has been assigned to operate on, and determine a corresponding clock frequency for that particular WLAN channel.

The method 500 proceeds to step 530, where the processor 310 sends a command to the logic device 340 to select the particular clock source and corresponding clock signal that is to be used to drive the PCI bus 335. Depending on which one is selected, this can be either the first clock signal generated by the first clock source 350-1 or the second clock signal that is generated by the second clock source 350-2. In response to the command, the logic device 340 selects either the first clock signal 355-1 or the second clock signal 355-2, and, at step 530, begins driving the PCI bus 335 with that clock signal. This way, depending on which WLAN channel the WLAN radio module 330 is operating over, either the first clock signal 355-1 or the second clock signal 355-2 can be used to drive the PCI bus 335 without causing interference at the WLAN radio module 330.

In one example, when the device 300 is currently operating using the first clock signal 355-1 (i.e., from the first clock source 350-1) to drive the PCI bus 335, and the device 300 switches to a different WLAN channel that is associated with the second clock source 350-2, the logic device 340 receives a command from the processor 310 that indicates that the second clock signal 355-2 is to now be selected as the particular clock signal to drive the PCI bus 335. In this situation, the logic device 340 is designed to transparently transition from the first clock signal 355-1 to the second clock signal 355-2 that is provided to the PCI bus 335. The logic device 340 ensures that switching takes place between the two clock sources and signals such that the switch does not cause a glitch on the PCI bus 335 or cause corruption of data being transferred over the bus 335.

For example, when clock frequencies are switched between a 64.000 MHz and 66.667 MHz, there is no correlation between these clocks. The logic device 340 includes logic to ensure that the clock change does not impact transactions on the bus 335 nor violate any min/max clock periods. In one implementation, the logic device 340 has logic which stops the current clock signal 355 (i.e., the first clock signal or second clock signal) for a short period of time and resumes operation with the new clock signal 355 (i.e., second clock signal or first clock signal) from the new clock source 350. In one implementation, the logic device 340 initiates a clock switch upon receiving a command from the processor 310 that sets or clears a bit in a register of the logic device 340. When the logic device 340 receives the bit change request, it waits for a falling edge of the current clock driving the PCI bus 335 to happen, holds the current clock low for the minimum amount of time defined by the PCI bus standard, waits for the clock being switched to also be low, and then makes the switch. Once the switch happens, the next rising edge of the new clock signal begins clocking the PCI bus again. Interference that would have resulted at the WLAN radio module 330 from the original clock signal can be reduced and/or eliminated.

For example, when the device 300 is currently operating on WLAN channel 4 and using the second clock signal 355-2 (i.e., from the second clock source 350-2) to drive the bus 335, and its channel assignment switches to WLAN channel 10, then the logic device 340 receives a command from the processor 310 that indicates that the first clock signal 355-1 is to be selected as the particular clock signal that drives the bus. In this situation, the logic device 340 is designed to transparently transition from the second clock signal 355-2 to the first clock signal 355-1 without causing a glitch on the PCI bus or corruption of data being transferred over the bus. Again, this way any interference that would have resulted at the WLAN radio module 330 from the second clock signal 355-2 (that is generated by the second clock source 350-2) will be reduced or eliminated entirely. In experimental testing, up to a 10 dB improvement was observed on some WLAN channels by switching to the appropriate clock source/signal for use with a particular WLAN channel.

While at least one exemplary embodiment has been presented in the foregoing detailed description of the invention, it should be appreciated that a vast number of variations exist.

Figure 6:
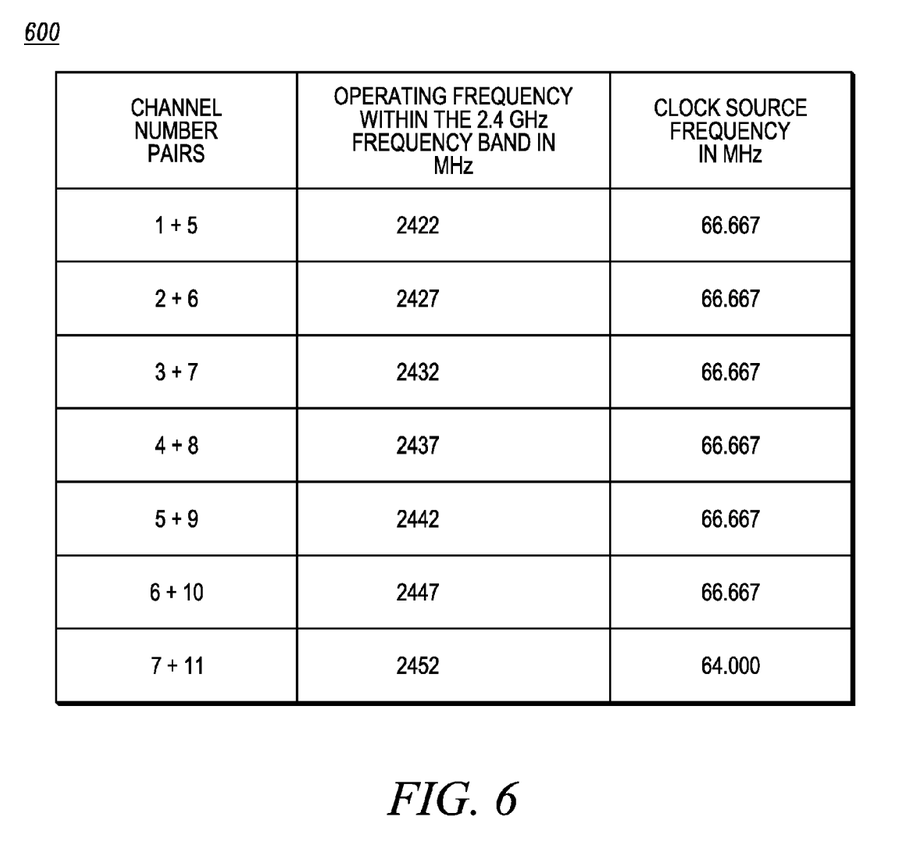
FIG. 6 is another non-limiting example of a lookup table (LUT) that can be used in accordance with some of the disclosed embodiments when the WLAN radio module operates in a 2.4 GHz Industrial Scientific and Medical (ISM) band.

For instance, it should also be appreciated that FIG. 4 is merely one non-limiting example of a LUT 400, and that many other variations can exist depending on the particular technology. For instance, when operating in a 40 MHz high throughput (HT40) mode, the WLAN radio module 330 uses two different antennas to simultaneously communicate over two different WLAN channels. FIG. 6 illustrates another non-limiting example of the LUT 600 that can be used when the WLAN radio module is operating in HT40 mode. In this example, the WLAN radio module 330 can operate over any one of the seven paired-WLAN channels at any particular time. Column 1 of the LUT 600 lists pairs of channel numbers (where each channel is in the 2.4 GHz frequency band), column 2 of the LUT 600 lists center frequencies corresponding to each pair of channel numbers in column 1, and column 3 lists a clock frequency that should be selected when the WLAN radio module 330 operates over a corresponding WLAN channel pair defined in columns 1 and 2. As such, the LUT 600 comprises a plurality of entries, where each entry is specified in a row of the table. Each entry includes (1) a particular pair of WLAN channel numbers, (2) a corresponding center frequency of those WLAN channels, and (3) a corresponding one of the first clock signal 355-1 or the second clock signal 355-2 that should be selected to drive the PCI bus 335 for that pair of WLAN channel numbers.

It should also be appreciated that the exemplary embodiment or exemplary embodiments are only examples, and are not intended to limit the scope, applicability, or configuration of the invention in any way. One of ordinary skill in the art appreciates that various modifications and changes can be made without departing from the scope of the invention as set forth in the claims below. As such, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents. Accordingly, the specification and figures are to be regarded in an illustrative rather than a restrictive sense, and all such modifications are intended to be included within the scope of present teachings. In addition, the benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for selecting one of a plurality of clock signals used to drive a bus of a radio device comprising a radio module coupled to the bus and designed to operate over a plurality of radio channels in a first frequency band, the method comprising:
    storing a look up table (LUT) comprising a plurality of entries, wherein each entry comprises: a particular one of the radio channels and a corresponding one of a first clock signal having a first clock frequency and a second clock signal having a second clock frequency that is to be selected;
    selecting, at a particular time, one of the radio channels that the radio module is to communicate over;
    determining from the LUT, based on the one of the radio channels that has been selected for the radio module to communicate over, that either the first clock signal or the second clock signal is to be used to drive the bus;
    sending a command indicating a selected clock signal from the determining step to a logic device;
    selecting, at the logic device based on the command, either the first clock signal or the second clock signal to drive the bus; and
    driving the bus with either the first clock signal or the second clock signal.

2. A method according to claim 1, when the radio device is operating using the first clock signal and, further comprising:
    receiving the command at the logic device that indicates that the logic device is to select the second clock signal as the clock signal that is provided to the bus; and transparently transitioning from the first clock signal to the second clock signal as the particular clock signal that is used to drive the bus.

3. A method according to claim 2, wherein the step of transparently transitioning from the first clock signal to the second clock signal as the particular clock signal that is used to drive the bus, comprises the steps of:
  receiving the command;
  waiting for a falling edge of the first clock signal to happen, stopping the first clock signal and holding the first clock signal low; and
  waiting for a next rising edge of the second clock signal and resuming operation at the next rising edge of the second clock signal with the second clock signal driving the bus.

4. A method according to claim 1, when the radio device is operating using the second clock signal and, further comprising:
  receiving the command at the logic device that indicates that the logic device is to select the first clock signal as the clock signal that is provided to the bus; and
  transparently transitioning from the second clock signal to the first clock signal as the particular clock signal that is used to drive the bus.

5. A method according to claim 4, wherein the step of transparently transitioning from the second clock signal to the first clock signal as the particular clock signal that is used to drive the bus, comprises the steps of:
  receiving the command;
  waiting for a falling edge of the second clock signal to happen, stopping the second clock signal and holding the second clock signal low; and
  waiting for a next rising edge of the first clock signal and resuming operation at the next rising edge of the first clock signal with the first clock signal driving the bus.

6. A method according to claim 1, wherein the first clock signal causes interference at the radio module when the radio module is operating over a first subset of the radio channels, and wherein the second clock signal, causes interference at the radio module when the radio module is operating over a second subset of the radio channels.

7. A method according to claim 6, wherein the first clock frequency is approximately 64.000 MHz, wherein the second clock frequency is approximately 66.667 MHz, and wherein the first frequency band is the 2.4 GHz frequency band.

8. A method according to claim 1, wherein the radio device is an access point and the radio channels are wireless local area network (WLAN) channels, wherein the radio module is a WLAN radio module, wherein the bus is a Peripheral Component Interconnect (PCI) bus and wherein the processor is an embedded network processor.

9. A radio frequency (RF) device, comprising:
  a bus;
  a first clock source that generates a first clock signal having a first clock frequency, and a second clock source that generates a second clock signal having a second clock frequency;
  a wireless local area network (WLAN) radio module coupled to the bus, and being designed to communicate over a plurality of WLAN channels in a first frequency band, and being configured at a particular time to operate over one of the WLAN channels;
  a look up table (LUT) comprising a plurality of entries, wherein each entry comprises: a particular one of the WLAN channels and a corresponding one of the first clock signal or the second clock signal that is to be used to drive the bus;
  a processor coupled to the bus and the WLAN radio module, wherein the processor is designed to determine from the LUT, based on a particular WLAN channel that has been selected for the WLAN radio module to communicate over, that either the first clock signal or the second clock signal is to be used to drive the bus, wherein the processor is further designed to generate and send a command to select either the first clock signal or the second clock signal as the particular clock signal that is to be used to drive the bus; and
  a logic device, coupled to the processor, the WLAN radio module, the first clock source, the second clock source, wherein the logic device is designed to receive the command indicating the selected clock signal from the processor, and drive the bus with either the first clock signal or the second clock signal specified by the command.

10. A RF device according to claim 9, when the first clock signal is driving the bus and the WLAN radio module prepares to change WLAN channels causing the logic device to receive the command to select the second clock signal as the particular clock signal that drives the bus, wherein the logic device is designed to transparently transition from the first clock signal to the second clock signal as the particular clock signal that drives the bus.

11. A RF device according to claim 10, when the second clock signal is driving the bus and the WLAN radio module prepares to change WLAN channels causing the logic device to receive the command to select the first clock signal as the particular clock signal that drives the bus, wherein the logic device is designed to transparently transition from the second clock signal to the first clock signal as the particular clock signal that drives the bus.

12. A RF device according to claim 9, wherein the first clock signal causes interference at the WLAN radio module when the WLAN radio module is operating over a first subset of the WLAN channels, and wherein the second clock signal, causes interference at the WLAN radio module when the WLAN radio module is operating over a second subset of the WLAN channels.

13. A RF device according to claim 12, wherein the first clock frequency is approximately 64.000 MHz, wherein the second clock frequency is approximately 66.667 MHz, and wherein the first frequency band is the 2.4 GHz frequency band.

14. A RF device according to claim 9, wherein the WLAN-enabled device is an access point, wherein the bus is a Peripheral Component Interconnect (PCI) bus and wherein the processor is an embedded network processor.

15. A network infrastructure device, comprising:
  a WLAN radio module designed to operate over a plurality of WLAN channels in a first frequency band;
  a Peripheral Component Interconnect (PCI) bus coupled to the WLAN radio module;
  a look up table (LUT) comprising a plurality of entries, wherein each entry comprises: a particular one of the WLAN channels and a corresponding one of a first clock signal having a first clock frequency and a second clock signal having a second clock frequency that is to be selected, wherein the first clock signal causes interference at the WLAN radio module when operating over a first subset of the WLAN channels, and wherein the second clock signal causes interference at the WLAN radio module when operating over a second subset of the WLAN channels;
  a processor designed to select from the LUT, based on a particular one of the WLAN channels that has been selected for the WLAN radio module to communicate over, either the first clock signal or the second clock signal that is to be used to drive the bus; and a device designed to receive the first clock signal, the second clock signal and a command indicating a selected clock signal from the processor, and drive the bus, in response to the command, with either the first clock signal or the second clock signal that is selected by the processor.

16. A network infrastructure device according to claim 15, wherein the first clock frequency is approximately 64.000 MHz, wherein the second clock frequency is approximately 66.667 MHz, and wherein the first frequency band is the 2.4 GHz frequency band.

* * * * *